(12) United States Patent
Vasavada et al.

(10) Patent No.: US 8,626,535 B2
(45) Date of Patent: Jan. 7, 2014

(54) SYSTEM AND METHOD FOR PROVIDING SHIPPING INSURANCE AS A SERVICE

(75) Inventors: Maulin Vasavada, San Jose, CA (US); Prakash Muppirala, San Jose, CA (US); Mohan Jayapal, Cupertino, CA (US); Sanjay Narang, Foster City, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/079,625

(22) Filed: Apr. 4, 2011

(65) Prior Publication Data

US 2012/0116823 A1 May 10, 2012

Related U.S. Application Data

(60) Provisional application No. 61/412,256, filed on Nov. 10, 2010.

(51) Int. Cl.
*G06Q 40/00* (2012.01)
*G06Q 30/00* (2012.01)

(52) U.S. Cl.
CPC ........... *G06Q 40/00* (2013.01); *G06Q 30/00* (2013.01)
USPC .......... 705/4; 705/26.1; 705/26.35; 705/37

(58) Field of Classification Search
None
See application file for complete search history.

(56) References Cited

U.S. PATENT DOCUMENTS

| | | | |
|---|---|---|---|
| 6,405,177 B1 * | 6/2002 | DiMattina | 705/26.41 |
| 6,460,020 B1 * | 10/2002 | Pool et al. | 705/7.29 |
| 6,856,963 B1 * | 2/2005 | Hurwitz | 705/7.29 |
| 7,587,353 B2 * | 9/2009 | Melchior et al. | 705/37 |
| 7,596,529 B2 * | 9/2009 | Mascavage et al. | 705/39 |
| 7,945,492 B1 * | 5/2011 | Sun et al. | 705/35 |
| 7,962,385 B2 * | 6/2011 | Falk et al. | 705/35 |
| 8,095,395 B2 * | 1/2012 | Cunniff et al. | 705/4 |
| 2002/0007340 A1 * | 1/2002 | Isaf et al. | 705/37 |
| 2002/0087371 A1 * | 7/2002 | Abendroth | 705/7 |
| 2002/0091620 A1 * | 7/2002 | Lin | 705/37 |
| 2002/0095356 A1 * | 7/2002 | Tonegawa et al. | 705/27 |
| 2002/0095373 A1 * | 7/2002 | Melchior et al. | 705/39 |
| 2002/0095379 A1 * | 7/2002 | Likourezos et al. | 705/40 |
| 2002/0099567 A1 * | 7/2002 | Joao | 705/1 |
| 2002/0099655 A1 * | 7/2002 | Melchior et al. | 705/40 |
| 2002/0107785 A1 * | 8/2002 | Melchior et al. | 705/37 |
| 2002/0120473 A1 * | 8/2002 | Wiggins | 705/4 |
| 2002/0120475 A1 * | 8/2002 | Morimoto | 705/4 |
| 2002/0120527 A1 * | 8/2002 | Lam et al. | 705/26 |
| 2002/0120555 A1 * | 8/2002 | Lerner | 705/37 |
| 2002/0169710 A1 * | 11/2002 | Morimoto | 705/37 |
| 2002/0178021 A1 * | 11/2002 | Melchior et al. | 705/1 |
| 2002/0198744 A1 * | 12/2002 | Sagalow et al. | 705/4 |

(Continued)

OTHER PUBLICATIONS

Collopy—Basic-Abstract: Use; 3-pages.*

*Primary Examiner* — Gregory Johnson
(74) *Attorney, Agent, or Firm* — Schwegman Lundberg & Woessner, P.A.

(57) ABSTRACT

A shipping insurance service application has an electronic marketplace platform interface, a shipping insurance module, and an insurance provider module. The electronic marketplace platform interface communicates with at least one electronic marketplace application. The shipping insurance module provides a shipping insurance policy to a seller of the corresponding electronic marketplace application and processes a claim from the seller of the corresponding electronic marketplace application based on the shipping insurance policy. The carrier module obtains the shipping insurance policy from an insurance provider among a plurality of insurance providers.

21 Claims, 8 Drawing Sheets

(56) References Cited

U.S. PATENT DOCUMENTS

| | | | |
|---|---|---|---|
| 2003/0061104 A1* | 3/2003 | Thomson et al. | 705/26 |
| 2003/0061146 A1* | 3/2003 | Thompson | 705/37 |
| 2003/0135421 A1* | 7/2003 | Cales et al. | 705/26 |
| 2003/0140011 A1* | 7/2003 | Ishimi et al. | 705/76 |
| 2003/0144971 A1* | 7/2003 | Das et al. | 705/401 |
| 2003/0182222 A1* | 9/2003 | Rotman et al. | 705/37 |
| 2004/0249643 A1* | 12/2004 | Ouyang et al. | 705/1 |
| 2005/0097031 A1* | 5/2005 | Seo | 705/38 |
| 2005/0097040 A1* | 5/2005 | Chen et al. | 705/40 |
| 2005/0160121 A1* | 7/2005 | Kawabata et al. | 708/160 |
| 2005/0177448 A1* | 8/2005 | Fu et al. | 705/26 |
| 2005/0240525 A1* | 10/2005 | Bagayatkar | 705/40 |
| 2005/0251410 A1* | 11/2005 | Kahn | 705/1 |
| 2005/0283425 A1* | 12/2005 | Grove et al. | 705/37 |
| 2005/0289039 A1* | 12/2005 | Greak | 705/37 |
| 2006/0064409 A1* | 3/2006 | Hardwick | 707/3 |
| 2006/0095343 A1* | 5/2006 | Clarke et al. | 705/26 |
| 2007/0080218 A1* | 4/2007 | Madsen et al. | 235/383 |
| 2008/0027737 A1* | 1/2008 | Watkins | 705/1 |
| 2008/0126218 A1* | 5/2008 | Alvarado et al. | 705/26 |
| 2008/0140577 A1* | 6/2008 | Rahman et al. | 705/71 |
| 2008/0162305 A1* | 7/2008 | Rousso et al. | 705/27 |
| 2009/0083078 A1* | 3/2009 | Landstrom et al. | 705/4 |
| 2009/0150296 A1* | 6/2009 | Kirovski et al. | 705/80 |
| 2010/0057586 A1* | 3/2010 | Chow | 705/26 |
| 2010/0106621 A1* | 4/2010 | Verchere | 705/27 |
| 2010/0131301 A1* | 5/2010 | Collopy et al. | 705/4 |
| 2011/0131135 A1* | 6/2011 | Carlson et al. | 705/44 |
| 2011/0161182 A1* | 6/2011 | Racco | 705/14.73 |
| 2011/0178899 A1* | 7/2011 | Huszar | 705/27.2 |
| 2012/0116823 A1* | 5/2012 | Vasavada et al. | 705/4 |

* cited by examiner

SYSTEM AND METHOD FOR PROVIDING SHIPPING INSURANCE AS A SERVICE

CROSS-REFERENCE TO RELATED APPLICATION

This application claims priority from U.S. Provisional Patent Application Ser. No. 61/412,256 filed Nov. 10, 2010, which is incorporated herein by reference in its entirety.

TECHNICAL FIELD

This application relates generally to the field of computer technology, and in a specific example embodiment, a method and system for providing an insurance policy.

BACKGROUND

Websites provide a number of publishing, listing, and price-setting mechanisms whereby a publisher (e.g., a seller) may list or publish information concerning items for sale. The process of creating a listing may be a time-consuming and tedious process. The seller may not have a good idea of what the selling price should be, how much to charge for shipping, or what should go in a description for their item.

Currently, the provision of shipping insurance for items transacted (e.g., by an ecommerce retailer or marketplace) presents a number of challenges. Particularly, in the event that a shipped item is received by a buyer in a damaged condition, or this shipment is lost, it may be difficult for the seller to recover the expense of the damage or a lost item. While the shipping carriers such as USPS (UNITED STATES POSTAL SERVICE)), UPS (United Parcel Service), FedEx (Federal Express) do offer insurance, the seller typically needs to provide evidence of the damaged delivery or loss to the shipping carrier. This requires that the buyer needs to ship the damaged item back to the seller, as the shipping carrier will only deal with the party (i.e. the seller) that purchased the insurance policy. This presents a number of challenges to sellers. Other companies enable a seller to buy insurance. However, the claim process for the insurance provided by these services is complicated and challenging. Furthermore, most of the shipping carriers (E.g., USPS) offer only a flat insurance rate that is only based on the value of the merchandise being shipped for all sellers.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system computes a shipping insurance rate for a seller of an electronic marketplace with an insurance provider. A shipping insurance service application has an electronic marketplace platform interface, a shipping insurance module, and an insurance provider module. The shipping insurance module is thus capable of interfacing with different electronic marketplace platforms and with different insurance providers to provide the shipping insurance policy for the seller. In other words, the shipping insurance module is platform neutral and carrier neutral. The electronic marketplace platform interface communicates with at least one electronic marketplace application. The shipping insurance module provides a shipping insurance policy to a seller of the corresponding electronic marketplace application and processes a claim from the seller of the corresponding electronic marketplace application based on the shipping insurance policy. The carrier module obtains the shipping insurance policy from an insurance provider among a plurality of insurance providers.

Figure 1:
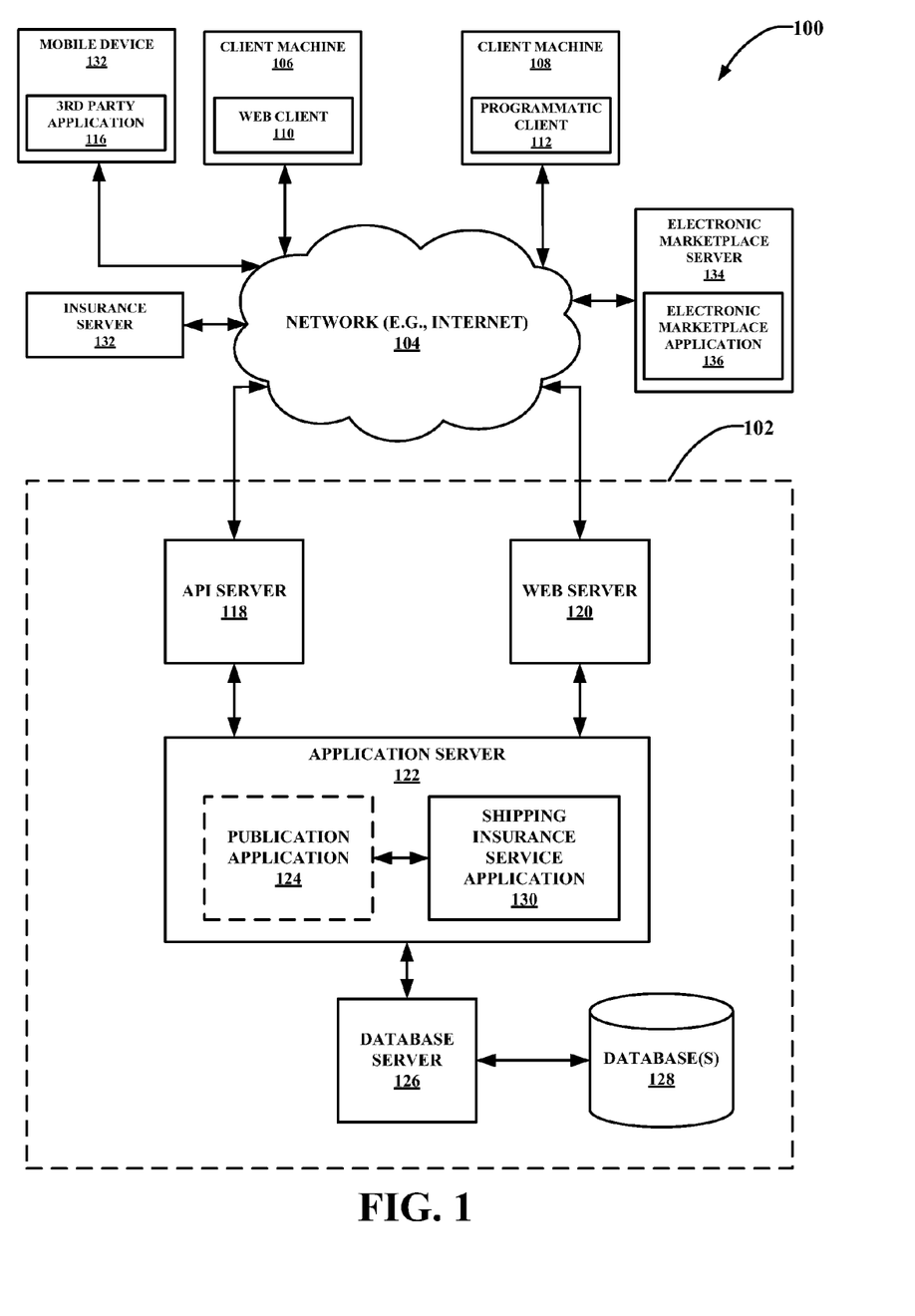
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user reputation values; user profiles; user attributes; product and service reviews and information, such as pricing and descriptive information; product, service, manufacture, and vendor recommendations and identifiers;

product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a mobile device 132 with a third party application 116. It can be appreciated in various embodiments the client machine 106, 108, or mobile device 132 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132 may also be in communication with the network-based publisher 102 via a web server 120. The mobile device 132 may include a portable electronic device providing at least some of the functionalities of the client machines 106 and 108. The mobile device 132 may include the third party application 116 (or a web client) configured communicate with application server 122.

Turning specifically to the network-based publisher 102, an application program interface (API) server 118 and a web server 120 are coupled to, and provide programmatic and web interfaces respectively to, one or more application servers 122. The application servers 122 host a shipping insurance application 130 and optionally a publication application 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or mobile device 132).

In one embodiment, the network-based publisher 102 provides a multitude of feedback, reputation, aggregation, and listing and price-setting mechanisms whereby a user may be a seller or buyer who lists or buys goods and/or services (e.g., for sale) published on the network-based publisher 102.

The publication application 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users. It should be noted that the publication application 124 optionally resides on application server 122. The publication application 124 may also be referred to as an electronic marketplace application. Application server 122 communicates with other electronic marketplace applications 136 that reside on other electronic marketplace servers 134. Furthermore, application server 122 communicates with other insurance server(s) 132 to obtain different insurance underwriters for the shipping insurance policy.

The shipping insurance service application 130 computes a shipping insurance rate and generates a shipping insurance to a seller of a corresponding electronic marketplace application 136, 134 based on an insurance provider 132. In one embodiment, the shipping insurance service application 130 determines the shipping insurance rate to a seller based on the seller's profile associated with the publication application 124, 136 and optionally from other third party applications (e.g. commercial websites, social networking websites, credit rating websites, and so forth).

Items shipped from a seller to a buyer are thus insured against loss (the buyer does not receive the shipped goods) and/or damages (the buyer receives the shipped goods but they are damaged). Embodiments of the shipping insurance service application 130 are further described below.

Figure 2:
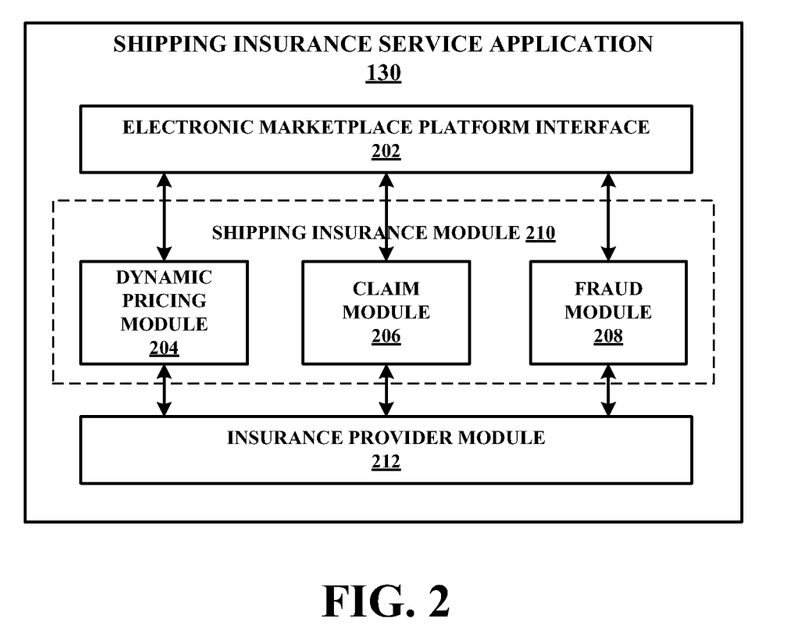
FIG. 2 is a block diagram illustrating an example embodiment of a shipping insurance application.

FIG. 2 is a block diagram illustrating an example embodiment of the shipping insurance service application 130. The shipping insurance service application 130 includes an electronic marketplace platform interface 202, a shipping insurance module 210, and an insurance provider module 212.

The electronic marketplace platform interface 202 communicates with several electronic marketplace applications via a network. In one embodiment, each electronic marketplace application may reside independently on different servers. Each electronic marketplace application has its own platform (e.g. rules, user interface, management, and so forth). As such the electronic marketplace platform interface is capable of communicating with different electronic marketplace platforms, independent from one another.

The shipping insurance module 210 provides a shipping insurance policy to a seller of the corresponding electronic marketplace application and processes a claim from the seller of the corresponding electronic marketplace application based on the shipping insurance policy.

The insurance provider module 212 obtains the shipping insurance policy from an insurance provider among a plurality of insurance providers. In particular, the insurance provider module 212 is capable of interfacing with different insurance provider servers 132 in order to obtain a variety of insurance rates and to provide a diversity of insurance underwriters. As such, the insurance policy to be generated by the shipping insurance module 210 is not limited to one specific insurance provider.

The shipping insurance module 210 includes a dynamic pricing module 204, a claim module 206, and a fraud module 208. The dynamic pricing module 204 computes the shipping insurance policy rate for the seller. The dynamic pricing module 204 is described further below with respect to FIG. 3. The claim module 206 processes a claim from the seller. The claim module 206 is described further below with respect to FIG. 4. The fraud module 208 detects a fraudulent activity associated with the claim from the seller.

The fraud detection module 208 determines a fraudulent activity from the buyer or the seller related to the shipped item. For example, a fraudulent activity may be determined when the claim from the seller is not validated by the buyer (e.g. the buyer claims that the item was received, the seller claims that the item was received in a damaged condition). Other fraudulent activity may be determined based on a transactional history of the seller and the buyer, the address of the buyer or seller, a credit card associated with other fraudulent activities, a credit card flagged from a financial institution, the number of claims filed by the seller, the number of complaints filed by the buyer, the value of the shipped item, and so forth. If the fraud detection module 208 suspects that there is a fraudulent activity, the fraud detection module 208 may pause the claim processing pending further investigation.

In another embodiment, the shipping insurance service application 130 includes a shipping label module (not shown) that can generate a shipping label that incorporates the shipping insurance policy information as generated by the shipping insurance module 210. For example, once the seller opts to participate in the shipping insurance program, the seller is offered to purchase a shipping label that includes a tracking number associated with the insurance policy number generated by shipping insurance module 210. In one embodiment, the shipping label module offers the seller the choice of shipping rates (e.g. express, standard, value). The shipping label module may obtain information (the name and address of the seller and the buyer, dimension of the package, weight of the package, and weight of item) from the publication application 124, the database server 126, and the database 128.

Figure 3:
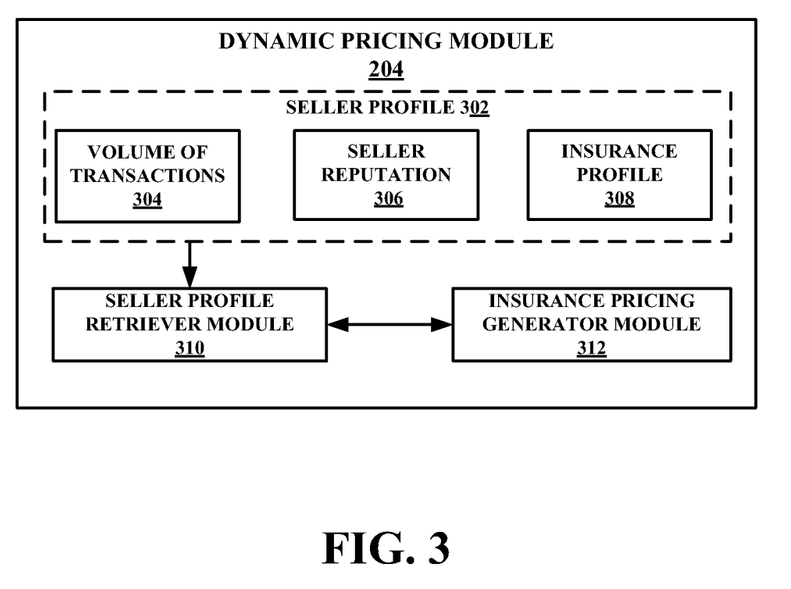
FIG. 3 is a block diagram illustrating an example embodiment of a dynamic pricing module.

FIG. 3 is a block diagram illustrating an example embodiment of the dynamic pricing module 204. A seller profile retriever module 310 retrieves a seller profile 302 on the corresponding marketplace application. An insurance pricing generator module 312 computes the shipping insurance policy rate for the seller based on the profile of the seller in the corresponding electronic marketplace and the insurance provider.

In one embodiment, the seller profile 302 corresponding to an electronic marketplace may be retrieved from database 128. In one embodiment, the seller profile 302 includes the volumes of transactions 304, the seller's reputation 306, the seller's insurance profile 308.

The volume of transactions 304 may include the total number of items sold by the seller in the corresponding electronic marketplace. The volume of transactions 304 also includes the total sales amount of items sold by the seller in the corresponding electronic marketplace.

The seller reputation 306 may include a feedback rating of the seller, a shipping rating of the seller, and a number of complaints from buyers. For example, the feedback rating includes ratings from buyers who previously purchased from the seller and provided a rating of how satisfied the buyers were with respect to the financial transaction with the seller. The shipping rating illustrates how fast the seller ships the item from the time the order was placed by the corresponding buyer. The number of complaints may include complaints filed by buyers with the electronic marketplace with respect to their financial transactions with the seller.

In another embodiment, the seller profile 302 may further include other profiles retrieved from other websites such as credit rating agencies, other electronic marketplaces, and so forth. The additional information from other third party websites further enhances the computation of the shipping insurance rate tailored to the seller in particular. For example, a seller with a high credit score and at least a 99% positive feedback rating with a minimum volume of sales from another electronic marketplace will likely be offered a deep discount on the shipping insurance rate. Those of ordinary skills in the art will recognize that other types of ratings may be further provided to enhance the computation of the shipping insurance rate for the seller.

In another embodiment, the seller profile 302 includes different tiers of sellers where each tier has a corresponding discount rate. For example, a first tier of sellers includes a 50% discount rate off a base shipping insurance rate, a second tier of sellers includes a 30% discount rate off the base shipping insurance rate, and a third tier of sellers includes a 10% discount rate off the base shipping insurance rate. The first tier of sellers includes sellers meeting several conditions (e.g. a maximum of predefined number of claims previously filed within the last n years, a minimum monetary amount of goods sold and a minimum number of goods sold in the electronic marketplace within a predefined period of time). The second tier of sellers includes sellers meeting the same conditions but with different predefined numbers.

The insurance profile 308 may include a profile of the seller associated with a corresponding insurance provider. For example, a seller may have two claims pending with one insurance provider and no other claims pending with other insurance providers.

The insurance pricing generator module 312 computes the shipping insurance rate for the seller based on the seller's profile 302, the insurance provider, and the selected coverage. In one embodiment, the insurance pricing generator module 312 computes the shipping insurance rate for the seller using different weights associated with each profile information (volume of transactions 304, seller reputation 306, insurance profile 308). The insurance pricing generator module 312 may factor in the seller reputation 306 from other electronic marketplaces.

The shipping insurance policy can be identified with a unique policy number for the transaction. In another embodiment, the policy number may be a unique identifier associated with the seller for all eligible transactions from the seller. The insurance policy may be provided by the online marketplace and underwritten by a financial institution. In one embodiment, the shipping insurance policy is generated based on the value of the shipped good. The seller may have the option to choose the coverage value of the shipping insurance policy.

In another embodiment, the dynamic pricing module 204 may also include a seller shipping insurance eligibility module (not shown) to determine whether a seller is eligible to purchase the shipping insurance based on at least a record of the seller, a shipping-from address, and a shipping-to address. For example, sellers with poor selling records and/or negative feedbacks from buyers may not be eligible to participate in the shipping insurance program. In another example, a destination address (shipping-to) or an origin address (shipping-from) associated with an unusually high number of complaints from buyers or prior claims from sellers may prevent a seller from qualifying to participate in the shipping insurance program. Those of ordinary skills in the art will recognize that other factors (e.g. number of transactions from the seller/buyer, type of goods being shipped, value of the goods being shipped, and so forth . . . ) may be used to determine whether the seller is eligible to participate in the shipping insurance program. Once the seller is determined to be eligible, the seller shipping insurance eligibility module 302 may present the seller with an offer/option to purchase the shipping insurance program through an online marketplace prior to the seller shipping the goods to the buyer. The seller may choose then whether to participate in the shipping insurance program. In one embodiment, the insurance policy fee to participate in the shipping insurance program may be deducted from the payment from the buyer or may be paid up front by the seller.

Figure 4:
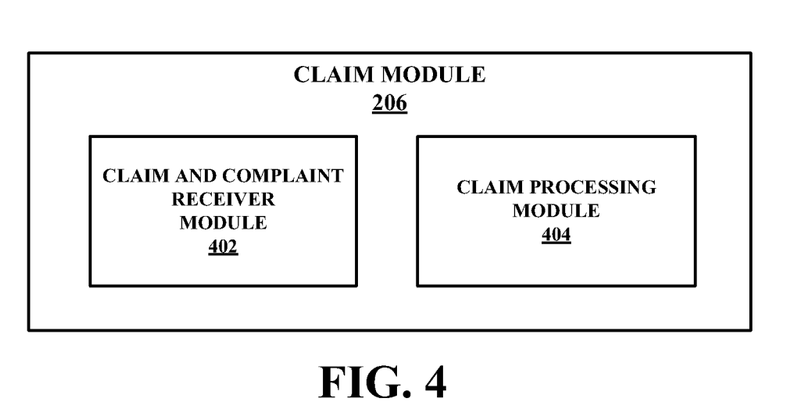
FIG. 4 is a block diagram illustrating an example embodiment of a claim module.

FIG. 4 is a block diagram illustrating an example embodiment of the claim module 206. The claim module 206 may include a claim and complaint receiver module 402 and a claim processing module 404. The claim and complaint receiver module 402 may receive a claim from the seller based on the shipping insurance policy. The claim and complaint receiver module 402 may also receives a complaint from the buyer where the complaint is for receiving the item damaged or not receiving the item. The claim processing module 404 processes the claim from the seller based on the corresponding complaint from the buyer.

Figure 5:
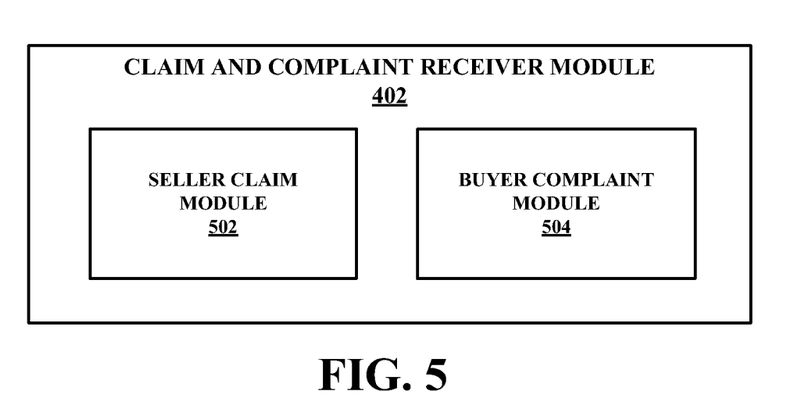
FIG. 5 is a block diagram illustrating an example embodiment of a claim and complaint receiver module.

FIG. 5 is a block diagram illustrating an example embodiment of the claim and complaint receiver module 402. The claim and complaint receiver module 402 includes a seller claim module 502 and a buyer complaint module 504. The seller claim module 502 receives the claim from the seller based on the shipping insurance policy. The buyer complaint module 504 receives the complaint from the buyer based on the shipped item.

The seller claim module 502 receives a claim from the seller based on the purchased shipping insurance policy. In one embodiment, the claim includes information such as whether the item received by the buyer but was damaged or whether the package was lost, the tracking information, and the claim amount. For example, the seller may receive a communication from the buyer that the goods received were damaged during shipping. In another example, the seller receives a communication from the buyer that the buyer did not receive the package within a predetermined amount of time. Based on the communication from the buyer, the seller may file a claim using the seller claim module 502. In one embodiment, the seller claim module 502 presents the seller with a web page comprising retrieved information from database 128 associated with the financial transaction between the seller and the buyer. The web page requests further information from the seller such as the reason for filing the claim and the claim amount. Once the claim is filed, the seller may receive a confirmation of the claim via email.

In another embodiment, the seller may file a claim only after a predetermined amount of time has elapsed from the time of shipping (e.g. 7 days for damaged item and 30 days for lost item) of the corresponding shipped goods. The seller claim module 502 may send an email to the buyer to confirm the claim from the seller.

The buyer complaint module 504 receives the complaint from the buyer based on the item. In one embodiment, the complaint includes information such as whether the received item was damaged or whether the package was lost, and the tracking information. For example, the complaint may specify that the buyer did not receive the package within a predetermined amount of time. In one embodiment, the buyer may file a complaint after a predetermined amount of time has elapsed from the time of shipping (e.g. 30 days). The buyer complaint module 504 may send an email to both the seller and the buyer to confirm the complaint from the buyer.

Figure 6:
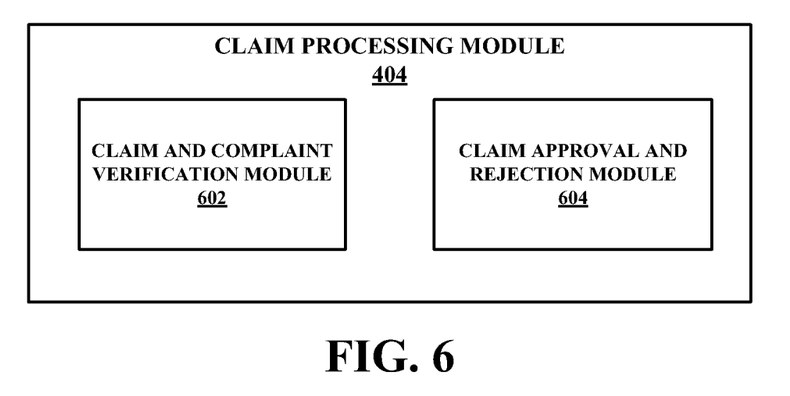
FIG. 6 is a block diagram illustrating an example embodiment of a claim processing module.

FIG. 6 is a block diagram illustrating an example embodiment of the claim processing module 404. The claim processing module 404 includes a claim and complaint verification module 602 and a claim approval and rejection module 604. The claim and complaint verification module 602 correlates the claim from the seller with the complaint from the buyer for the shipped item. The claim approval and rejection module 604 approves or rejects the claim from the seller based on results from the claim and complaint verification module, and the fraud module 208.

The claim and complaint verification module 602 correlates the claim from the seller with the complaint from the buyer for the shipped item. In one embodiment, the claim and complaint verification module 602 determines whether a claim from a seller with respect to a purchased shipping insurance policy on a shipped item corresponds to a complaint from a buyer with respect to the same shipped item. The claim and complaint verification module 602 may compare and correlate a number of information (e.g., tracking number, transaction identifier, item identifier, seller and buyer identity, shipping insurance policy number, claim and complaint reasons and so forth) available from the seller claim module 502 and the buyer complaint module 504 to verify that the information correlates and matches before approving or denying the seller's claim. For example, a buyer's complaint may indicate that the item has not been received by the buyer. The seller's claim may indicate that the item has not been received by the buyer. Because both buyer's complaint and seller's claim are consistent with each other, the seller's claim is validated and is likely to be approved.

However, the claim and complaint verification module 602 can determine any inconsistency between the seller's claim and the buyer's claim. For example, the buyer's complaint may indicate that the item was received in a damaged condition while the seller's claim may indicate that the item was not received by the buyer. Because both buyer's complaint and seller's claim are inconsistent and do not validate each other, the seller's claim is not validated and is likely to be denied.

In one embodiment, the claim and complaint verification module 602 correlates the claim from the seller with the complaint from the buyer for the shipped item based on the buyer validating the claim from the seller and based on the seller validating the complaint from the buyer. For example, the seller may have submitted a claim with the seller claim module 502. If the claim and complaint verification module 602 does not find a corresponding complaint from the buyer, the claim and complaint verification module 602 contacts the buyer to verify the validity of the claim. In other words, the claim and complaint verification module 602 will determine whether the claim from the seller correlates with a reason provided by the buyer in response to contacting the buyer. Thus, the buyer may validate the claim from the seller by responding to the claim and complaint verification module 602 that the item was indeed not received or received in a damaged condition as indicated in the claim from the seller. In another embodiment, the buyer has a predetermined amount of time to validate the claim from the seller (e.g. 15 days). If the claim from the seller is not validated within the predetermined amount of time, the claim from the seller may be denied.

In another embodiment, the buyer may have not received the purchased item within a predetermined amount of time or has received the purchased item in a damaged condition; the buyer may then contact the seller directly without filing a complaint with the buyer complaint module 504. The seller then files a claim with the seller claim module 502. The claim and complaint verification module 602 then contacts both the buyer and seller to validate the claim from the seller.

In another embodiment, the claim and complaint verification module 602 automatically and without human-intervention files the claim based on the seller failing to lodge the claim within a predetermined period, via an electronic marketplace on which a transaction of the item occurred. For example, a buyer has submitted a complaint to buyer complaint module 504. Within a predetermined amount of time, if the seller fails to file a claim corresponding to the buyer's complaint, the claim and complaint verification module 502 automatically proceeds without human intervention and files a claim on behalf of the seller. In this scenario, proceeds of the pay out from the shipping insurance are kept by the electronic marketplace.

The claim approval and rejection module 604 approves or denies the claim from the seller based on results from the claim and complaint verification module 602 and the fraud detection module 208. Once the claim and complaint verification module 602 validates the seller's claim and the fraud detection module 208 determines that no fraudulent activities exist, the claim approval and rejection module 604 proceeds with approving the pay out or refund to the seller. If the claim and complaint verification module 602 does not validate the seller's claim or the fraud detection module 208 determines that fraudulent activities exist, the claim approval and rejection module 604 may deny the claim or payout to the seller.

Figure 7:
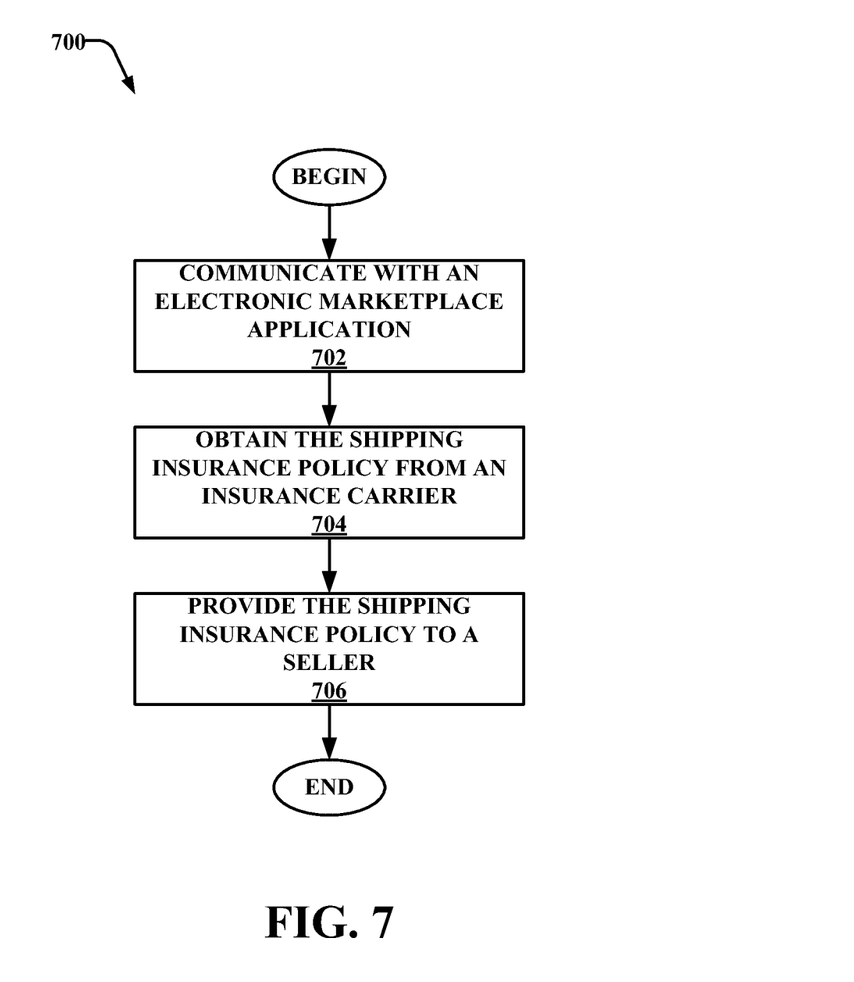
FIG. 7 is a flow chart of an example method for providing a shipping insurance policy to a seller of an electronic marketplace.

FIG. 7 is a flow chart of an example method for offering a shipping insurance policy to an eligible seller. At 702, the electronic marketplace platform interface 202 of the shipping insurance service application 130 communicates with at least one electronic marketplace application. At 704, a shipping insurance policy is obtained from an insurance provider among a plurality of insurance providers. At 706, the shipping insurance policy is provided to a seller of the corresponding electronic marketplace application.

Figure 8:
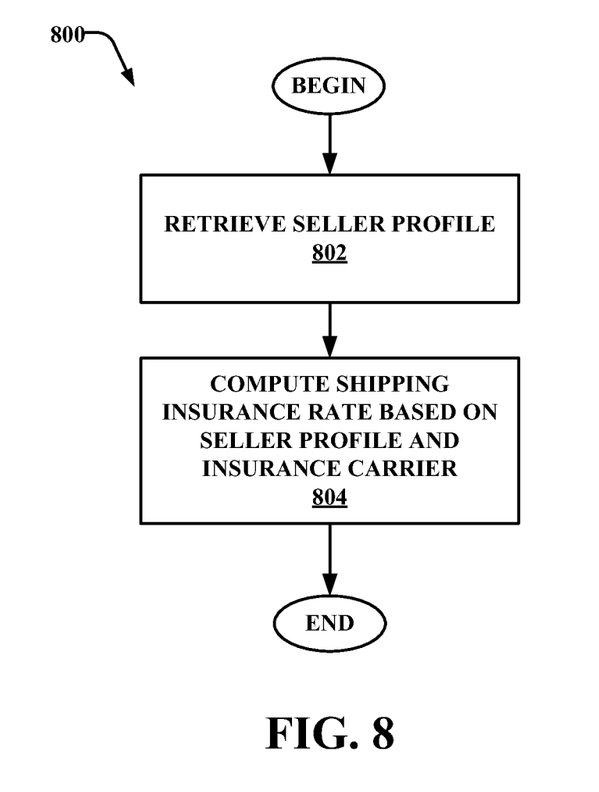
FIG. 8 is a flow chart of one embodiment of a method for computing a shipping insurance rate based on a seller profile.

FIG. 8 is a flow chart of one embodiment of a method for computing a shipping insurance rate based on a seller profile. At 802, a profile of the seller on the corresponding electronic marketplace application is retrieved. The profile of the seller includes a volume of transactions of the seller on the corresponding electronic marketplace, a reputation of the seller on the corresponding electronic marketplace, and an insurance profile of the seller. The volume of transactions comprises a total monetary amount of all transactions of the seller on the corresponding electronic marketplace or a total number of transactions of the seller on the corresponding electronic marketplace. The reputation of the seller comprises a feedback rating from buyers of the seller of the corresponding electronic marketplace. The insurance profile of the seller comprises a number of claims previously filed by the seller and a status of the claims previously filed by the seller.

At 804, the shipping insurance policy rate for the seller is computed based on the insurance provider and the profile of the seller.

Figure 9:
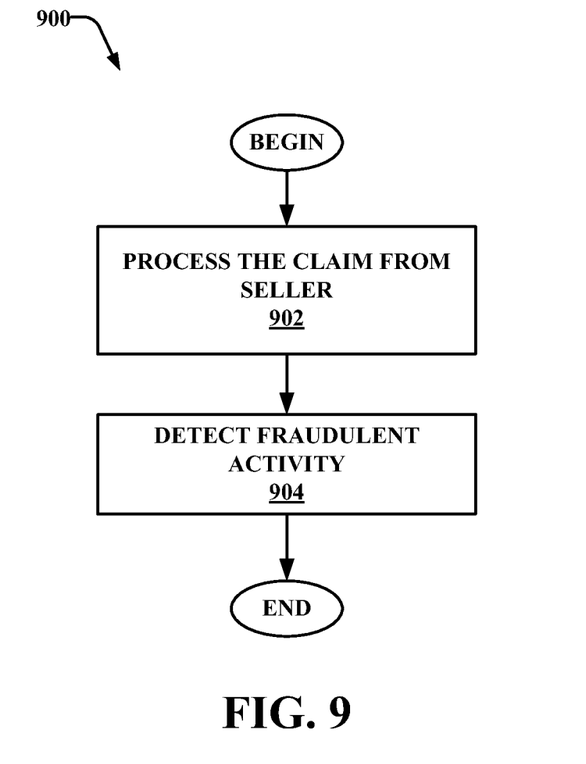
FIG. 9 is a flow chart of one embodiment of a method for processing an insurance claim.

FIG. 9 is a flow chart of one embodiment of a method for processing an insurance claim. At 902, the claim from the seller is processed. At 904, a fraudulent activity associated with the claim is determined.

Figure 10:
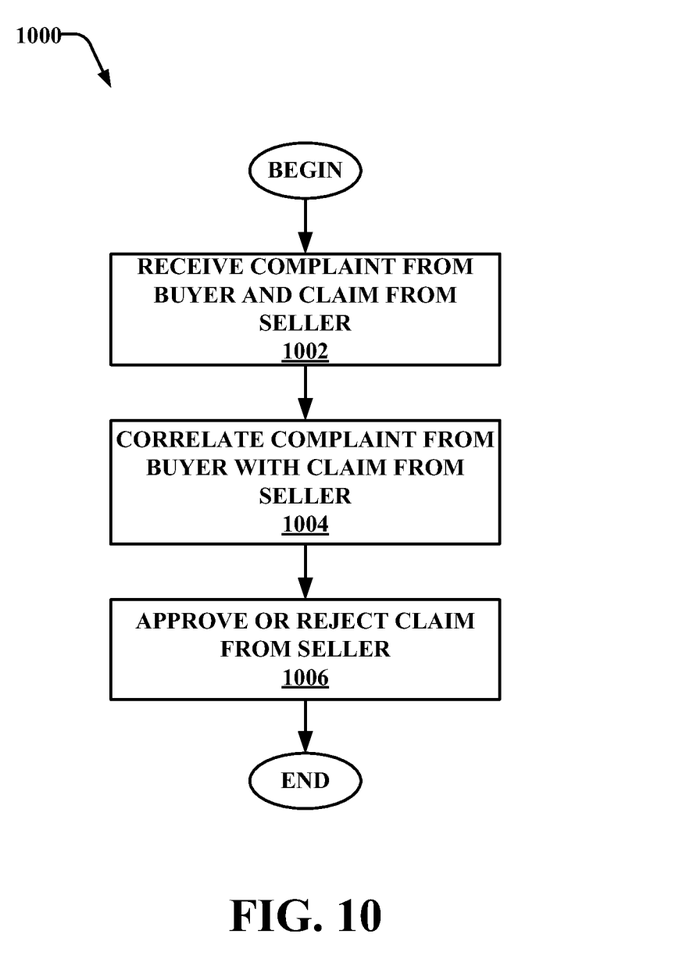
FIG. 10 is a flow chart of one embodiment of a method for approving or rejecting an insurance claim.

FIG. 10 is a flow chart of one embodiment of a method for approving or rejecting an insurance claim. At 1002, a claim from the seller based on the shipping insurance policy is received. In addition, a complaint from the buyer for receiving the item damaged or not receiving the item may also be received. At 1004, the claim from the seller is processed based on the corresponding complaint from the buyer. In one embodiment, the claim from the seller is correlated with the complaint from the buyer for the shipped item. At 1006, the claim from the seller is approved or rejected based on results from correlating the claim with the complaint and detecting a fraudulent activity.

Figure 11:
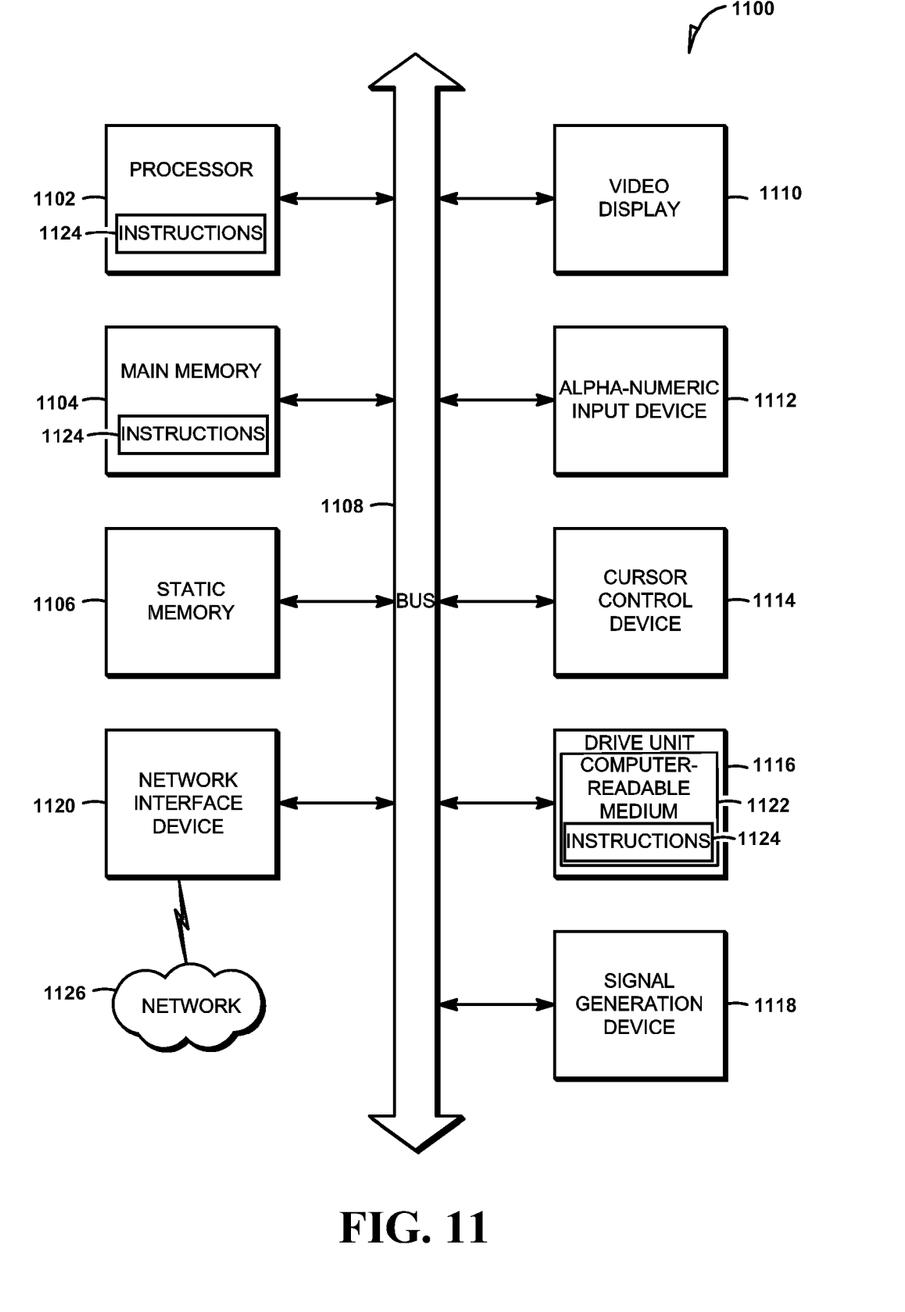
FIG. 11 shows a diagrammatic representation of machine in the example form of a computer system within which a set of instructions may be executed to cause the machine to perform any one or more of the methodologies discussed herein.

FIG. 11 shows a diagrammatic representation of machine in the example form of a computer system 1100 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
    at least one processor;
    an electronic marketplace platform interface, implemented by the at least one processor, configured to communicate with at least one electronic marketplace application;
    a shipping insurance module, implemented by the at least one processor, configured to present a plurality of shipping insurance policies from a plurality of insurance providers to a seller of the corresponding electronic marketplace application, to receive a selection of one of the shipping insurance policies from the seller, to provide a shipping insurance policy selected and paid for by the seller of the corresponding electronic marketplace application, and to process a claim from the seller using information from the corresponding electronic marketplace application and the shipping insurance policy;

an insurance provider module, implemented by the at least one processor, configured to obtain the shipping insurance policy from an insurance provider among the plurality of insurance providers; and a dynamic pricing module configured to receive a base shipping insurance rate for each insurance provider, to calculate a rate adjustment for the seller based on a tier profile of the seller, and to compute a shipping insurance policy rate for each shipping insurance policy using the basic shipping rate for each insurance provider modified with the rate adjustment for the seller.

2. The system of claim 1 wherein the shipping insurance module comprises:

a claim module configured to process the claim from the seller; and a fraud module configured to detect a fraudulent activity associated with the claim.

3. The system of claim 2 wherein the dynamic pricing module comprises:

a seller profile retriever module configured to retrieve a profile of the seller on the corresponding marketplace application; and an insurance pricing generator module configured to compute a shipping insurance policy rate for the seller based on the profile of the seller and the insurance provider.

4. The system of claim 3 wherein the profile of the seller comprises a volume of transactions of the seller on the corresponding electronic marketplace, a reputation of the seller on the corresponding electronic marketplace, and an insurance profile of the seller.

5. The system of claim 4 wherein the volume of transactions comprises a total monetary amount of all transactions of the seller on the corresponding electronic marketplace or a total number of transactions of the seller on the corresponding electronic marketplace, wherein the reputation of the seller comprises a feedback rating from buyers of the seller of the corresponding electronic marketplace, wherein the insurance profile of the seller comprises a number of claims previously filed by the seller and a status of the claims previously filed by the seller.

6. The system of claim 2 wherein the claim module comprises:

a claim and complaint receiver module configured to receive a complaint from a buyer for receiving an item damaged or not receiving the item, and to receive a claim from the seller based on the shipping insurance policy; and a claim processing module configured to process the claim from the seller based on the corresponding complaint from the buyer.

7. The system of claim 6 wherein the claim and complaint receiver module comprises a seller claim module configured to receive the claim from the seller based on the shipping insurance policy, and a buyer complaint module configured to receive the complaint from the buyer based on the item, wherein the claim processing module comprises a claim and complaint verification module configured to correlate the claim from the seller with the complaint from the buyer for a shipped item, and a claim approval and rejection module configured to approve or reject the claim from the seller based on results from the claim and complaint verification module, and the fraud module.

8. A computer-implemented method comprising:

communicating with at least one electronic marketplace application;

presenting a plurality of shipping insurance policies from a plurality of insurance providers to a seller of the corresponding electronic marketplace application;

receiving a selection of one of the shipping insurance policies from the seller;

providing a shipping insurance policy selected and paid for by the seller of the corresponding electronic marketplace application, and processing a claim from the seller using information from the corresponding electronic marketplace application and the shipping insurance policy;

obtaining the shipping insurance policy from an insurance provider among the plurality of insurance providers;

receiving a base shipping insurance rate for each insurance provider;

calculating a rate adjustment for the seller based on a tier profile of the seller; and computing a shipping insurance policy rate for each shipping insurance policy using the basic shipping rate for each insurance provider modified with the rate adjustment for the seller.

9. The computer-implemented method of claim 8 further comprising:

processing the claim from the seller; and detecting a fraudulent activity associated with the claim.

10. The computer-implemented method of claim 9 further comprising:

retrieving a profile of the seller on the corresponding electronic marketplace application.

11. The computer-implemented method of claim 10 wherein the profile of the seller comprises a volume of transactions of the seller on the corresponding electronic marketplace, a reputation of the seller on the corresponding electronic marketplace, and an insurance profile of the seller.

12. The computer-implemented method of claim 11 wherein the volume of transactions comprises a total monetary amount of all transactions of the seller on the corresponding electronic marketplace or a total number of transactions of the seller on the corresponding electronic marketplace, wherein the reputation of the seller comprises a feedback rating from buyers of the seller of the corresponding electronic marketplace, wherein the insurance profile of the seller comprises a number of claims previously filed by the seller and a status of the claims previously filed by the seller.

13. The computer-implemented method of claim 9 further comprising:

receiving a complaint from a buyer for receiving an item damaged or not receiving the item and a claim from the seller based on the shipping insurance policy; and processing the claim from the seller based on the corresponding complaint from the buyer.

14. The computer-implemented method of claim 13 further comprising:

correlating the claim from the seller with the complaint from the buyer for a shipped item; and approving or rejecting the claim from the seller based on results from correlating the claim with the complaint and detecting a fraudulent activity.

15. A non-transitory computer-readable storage medium storing a set of instructions that, when executed by a processor, cause the processor to perform operations, comprising:

communicating with at least one electronic marketplace application;

presenting a plurality of shipping insurance policies from a plurality of insurance providers to a seller of the corresponding electronic marketplace application;

receiving a selection of one of the shipping insurance policies from the seller;

providing a shipping insurance policy selected and paid for by the seller of the corresponding electronic marketplace application, and processing a claim from the seller using information from the corresponding electronic marketplace application and the shipping insurance policy;

obtaining the shipping insurance policy from an insurance provider among the plurality of insurance providers;

receiving a base shipping insurance rate for each insurance provider;

calculating a rate adjustment for the seller based on a tier profile of the seller; and computing a shipping insurance policy rate for each shipping insurance policy using the basic shipping rate for each insurance provider modified with the rate adjustment for the seller.

16. The non-transitory computer-readable storage medium of claim 15, wherein the processor further performs operations comprising:

processing the claim from the seller; and detecting a fraudulent activity associated with the claim.

17. The non-transitory computer-readable storage medium of claim 16, wherein the processor further performs operations comprising:

retrieving a profile of the seller on the corresponding electronic marketplace application; and computing the shipping insurance policy rate for the seller based on the profile of the seller and the insurance provider.

18. The non-transitory computer-readable storage medium of claim 17 wherein the profile of the seller comprises a volume of transactions of the seller on the corresponding electronic marketplace, a reputation of the seller on the corresponding electronic marketplace, and an insurance profile of the seller.

19. The non-transitory computer-readable storage medium of claim 18 wherein the volume of transactions comprises a total monetary amount of all transactions of the seller on the corresponding electronic marketplace or a total number of transactions of the seller on the corresponding electronic marketplace, wherein the reputation of the seller comprises a feedback rating from buyers of the seller of the corresponding electronic marketplace, wherein the insurance profile of the seller comprises a number of claims previously filed by the seller and a status of the claims previously filed by the seller.

20. The non-transitory computer-readable storage medium of claim 15, wherein the processor further performs operations comprising:

receiving a complaint from a buyer for receiving an item damaged or not receiving the item and a claim from the seller based on the shipping insurance policy; and processing the claim from the seller based on the corresponding complaint from the buyer.

21. The non-transitory computer-readable storage medium of claim 20, wherein the processor further performs operations comprising:

correlating the claim from the seller with the complaint from the buyer for a shipped item; and approving or rejecting the claim from the seller based on results from correlating the claim with the complaint and detecting a fraudulent activity.

* * * * *